US012277656B2

United States Patent
Lu et al.

(10) Patent No.: US 12,277,656 B2
(45) Date of Patent: Apr. 15, 2025

(54) AR-BASED VISUALIZATION OF ACTIVITY WITH COLLABORATION AMELIORATION

(71) Applicant: INTERNATIONAL BUSINESS MACHINES CORPORATION, Armonk, NY (US)

(72) Inventors: Fang Lu, Billerica, MA (US); Jeremy R. Fox, Georgetown, TX (US); Tushar Agrawal, West Fargo, ND (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 239 days.

(21) Appl. No.: 18/166,660

(22) Filed: Feb. 9, 2023

(65) Prior Publication Data

US 2024/0273827 A1 Aug. 15, 2024

(51) Int. Cl.
*G06T 19/00* (2011.01)
*G06F 3/04847* (2022.01)
(Continued)

(52) U.S. Cl.
CPC ........ *G06T 19/006* (2013.01); *G06F 3/04847* (2013.01); *G06Q 10/0633* (2013.01); *G06Q 10/067* (2013.01); *G06T 13/40* (2013.01)

(58) Field of Classification Search
None
See application file for complete search history.

(56) References Cited

U.S. PATENT DOCUMENTS 6,249,715 B1 6/2001 Yuri
9,643,314 B2 5/2017 Guerin
(Continued)

FOREIGN PATENT DOCUMENTS

CN 106078208 B 11/2016
KR 20050031202 A 4/2005

OTHER PUBLICATIONS

Wang et al. "Symbiotic human-robot collaborative assembly;" CIRP Annals—Manufacturing Technology; vol. 68, Issue 2, 2019, pp. 701-726; Published by Elsevier Ltd on behalf of CIRP (Year: 2019).*

(Continued)

*Primary Examiner* — Edward Martello
(74) *Attorney, Agent, or Firm* — Robert R. Aragona

(57) ABSTRACT

An embodiment for augmented reality (AR)-based visualization of an activity with collaboration amelioration is provided. The embodiment may include receiving real-time and historical data relating to an activity. The embodiment may also include identifying each step of the activity and a time to complete each step. The embodiment may further include executing a plurality of digital twin simulations of avatars of different types of workers performing each step of the activity. The embodiment may also include in response to determining a current distribution of human and robotic workers is not optimized, prompting a manager with an AR overlaid slider bar. The embodiment may further include generating a knowledge corpus including an optimized distribution. The embodiment may also include creating a visual animation of the optimized distribution. The embodiment may further include displaying the visual animation to at least one human worker via an AR device.

20 Claims, 3 Drawing Sheets

(51) Int. Cl.
  *G06Q 10/0633* (2023.01)
  *G06Q 10/067* (2023.01)
  *G06T 13/40* (2011.01)

(56) References Cited

U.S. PATENT DOCUMENTS

| | | |
|---|---|---|
| 2012/0265573 A1 | 10/2012 | Van Pelt |
| 2016/0257000 A1 | 9/2016 | Guerin |
| 2016/0328883 A1* | 11/2016 | Parfenov ............... G06T 17/00 |
| 2019/0325660 A1 | 10/2019 | Schmirler |
| 2020/0111044 A1 | 4/2020 | New, Jr. |
| 2020/0118194 A1 | 4/2020 | Greenberger |
| 2020/0336706 A1* | 10/2020 | Schmirler ............ G06T 19/006 |
| 2021/0374032 A1 | 12/2021 | Rakshit |
| 2021/0394359 A1* | 12/2021 | Mathieu ................ B25J 9/1661 |
| 2022/0101613 A1* | 3/2022 | Rockel ................ G06F 3/0304 |

OTHER PUBLICATIONS

Bilberg et al.; "Digital twin driven human-robot collaborative assembly;" CIRP Annals—Manufacturing Technology 68 (2019); pp. 499-502; Published by Elsevier Ltd on behalf of CIRP (Year: 2019).*

Lu et al.; "A generic and modularized Digital twin enabled human-robot collaboration;" 2022 IEEE International Conference on e-Business Engineering (ICEBE), Oct. 14-Oct. 16, 2022; pp. 66-73; published Oct. 1, 2022 (Year: 2022).*

Tuli et al.; "Knowledge-Based Digital Twin for Predicting Interactions in Human-Robot Collaboration;" 2021 IEEE 26th International Conference on Emerging Technologies and Factory Automation (ETFA); 8 pages (Year: 2021).*

Disclosed Anonymously, "System and Method for Process Discovery based on Movement Patterns of People or Objects," IP.com, IPCOM000198115D, Jul. 26, 2010, 8 Pages.

Hietanen, et al., "Proof of concept of a projection-based safety system for human-robot collaborative engine assembly", 2019 28th IEEE International Conference on Robot and Human Interactive Communication (RO-MAN), Oct. 14-18, 2019, 9 Pages. https://ieeexplore.ieee.org/document/8956446.

Hietanen, et al., "AR-based interaction for human-robot collaborative manufacturing" Elsevier, Robotics and Computer-Integrated Manufacturing, vol. 63, Jun. 2020, 101891, 10 Pages. https://www.researchgate.net/publication/341794660_AR-based_interaction_for_human-robot_collaborative_manufacturing.

IBM, "Advanced digital manufacturing technology solutions", IBM Digital Manufacturing Solutions, [Accessed on Jan. 24, 2023], pp. 1-9. Retrieved from Internet: https://www.ibm.com/industries/manufacturing.

IBM, "AR and VR in the workplace", IBM Institute for Business Value, [Accessed on Jan. 24, 2023], 6 Pages. Retrieved from the Internet: <https://www.ibm.com/thought-leadership/institute-business-value/report/ar-vr-workplace>.

IBM, "What is Industry 4.0", IBM.com, [Accessed on Jan. 24, 2023], 11 Pages. Retrieved from Internet: <https://www.ibm.com/topics/industry-4-0>.

Kuokkanen, "Global Mobile Robot Market Is Forecasted to Reach $72.5bn by 2030", Statzon, May 16, 2022, 8 Pages.

Statzon, "Datasets", Statzon.com, [accessed Feb. 9, 2023], 4 pages, Retrieved from the Internet: <https://app.statzon.com/datasets?topics=ZrQn&locations=6rM&providers=B6L&page%5Bnumber%5D=1&page%5Bsize%5D=24&sort=-published>.

* cited by examiner

AR-BASED VISUALIZATION OF ACTIVITY WITH COLLABORATION AMELIORATION

BACKGROUND

The present invention relates generally to the field of computing, and more particularly to a system for augmented reality (AR)-based visualization of an activity with collaboration amelioration.

Machines, such as heavy machinery on a factory floor, are currently used to perform a wide variety of activities in an industrial environment. On any industrial floor, there may be different types of activities performed as per a workflow sequence. Some of these activities require the collaboration of a human worker and/or robotic worker to complete. These human and robotic workers have differing skills in the industrial environment. During human and robotic worker collaboration, the human and robotic workers may be assigned to different tasks while performing the activity based on their capabilities. For example, the robotic worker may be able to lift and move heavy objects.

SUMMARY

According to one embodiment, a method, computer system, and computer program product for augmented reality (AR)-based visualization of an activity with collaboration amelioration is provided. The embodiment may include receiving real-time and historical data relating to an activity in an industrial environment. The embodiment may also include identifying each step of the activity and a time to complete each step of the activity based on the historical data. The embodiment may further include executing a plurality of digital twin simulations of different combinations of avatars of different types of workers performing each step of the activity based on the historical data. The embodiment may also include in response to determining a current distribution of human and robotic workers is not optimized based on a comparative evaluation of the plurality of digital twin simulations, prompting a manager with an AR overlaid slider bar regarding an objective of the manager. The embodiment may further include generating a knowledge corpus including an optimized distribution of the human and the robotic workers based on the objective of the manager and the comparative evaluation. The embodiment may also include creating a visual animation of the optimized distribution of the human and the robotic workers based on the knowledge corpus. The embodiment may further include displaying the visual animation to at least one human worker via an AR device as a digital image overlay.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
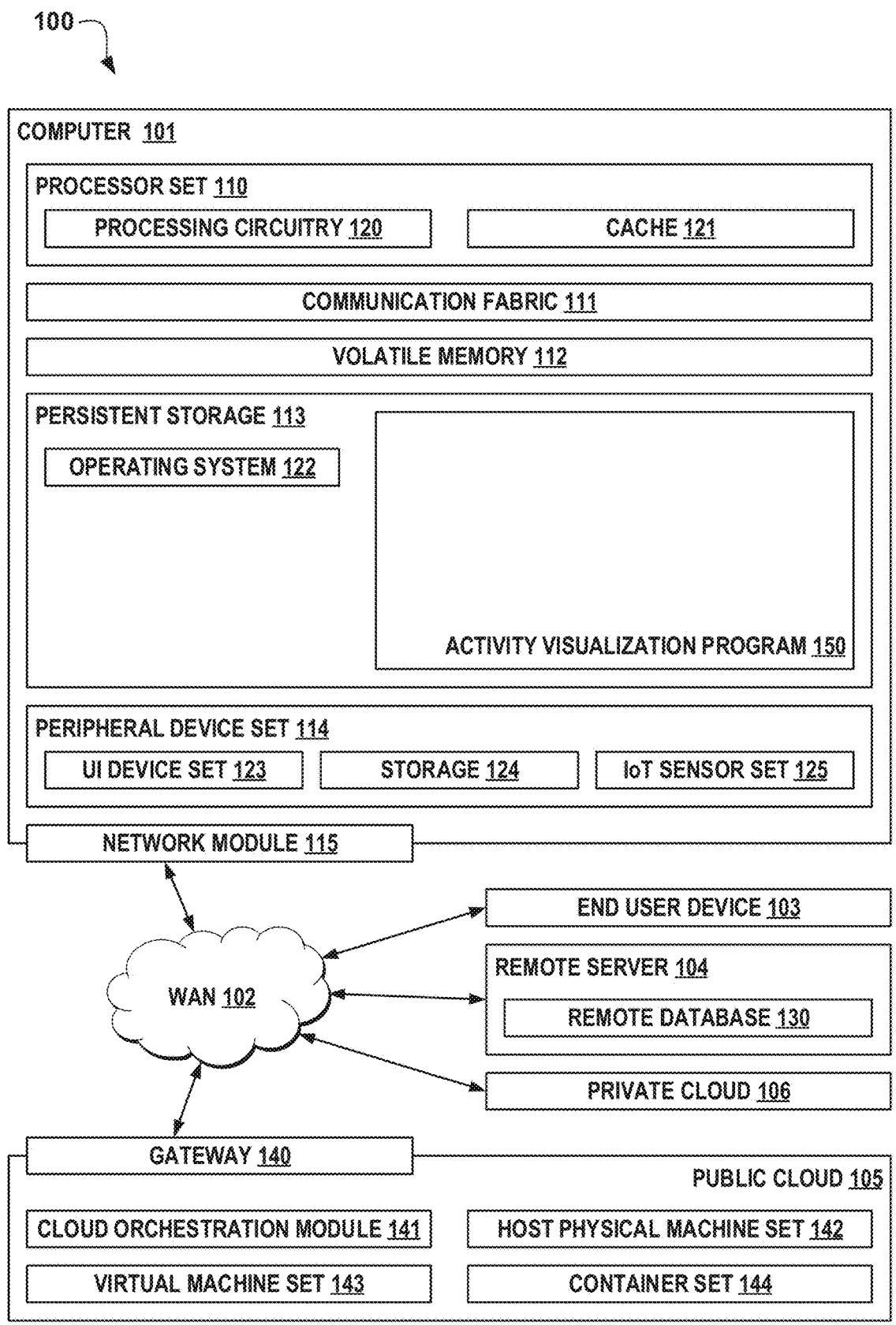
FIG. 1 illustrates an exemplary computing environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for augmented reality (AR)-based visualization of an activity with collaboration amelioration. The following described exemplary embodiments provide a system, method, and program product to, among other things, prompt a manager with an AR overlaid slider bar regarding an objective of the manager and, accordingly, display a visual animation of an optimized distribution of human and robotic workers to at least one human worker via an AR device. Therefore, the present embodiment has the capacity to improve industrial machine and manufacturing technology by dynamically and proactively determining the most optimum distribution of resources in any industrial environment.

As previously described, machines, such as heavy machinery on a factory floor, are currently used to perform a wide variety of activities in an industrial environment. On any industrial floor, there may be different types of activities performed as per a workflow sequence. Some of these activities require the collaboration of a human worker and/or robotic worker to complete. These human and robotic workers have differing skills in the industrial environment. During human and robotic worker collaboration, the human and robotic workers may be assigned to different tasks while performing the activity based on their capabilities. For example, the robotic worker may be able to lift and move heavy objects. While performing steps of the activity, the human workers and the robotic workers may not be able to collaborate with each other effectively. This problem is typically addressed by monitoring the distance between a robot and an operator. However, monitoring the distance fails to actively guide a human worker on how to perform the steps of the activity.

It may therefore be imperative to have a system in place to dynamically and proactively determine the most optimum distribution of resources in any industrial environment. Thus, embodiments of the present invention may provide advantages including, but not limited to, dynamically and proactively determining the most optimum distribution of resources in any industrial environment, actively guiding a human worker on how to perform the steps of the activity, and considering the skills of the human workers and the robotic workers when distributing resources. The present invention does not require that all advantages need to be incorporated into every embodiment of the invention.

According to at least one embodiment, in an industrial environment, real-time and historical data relating to an activity may be received in order to identify each step of the activity and a time to complete each step of the activity based on the historical data. Upon identifying each step, a plurality of digital twin simulations of different combinations of avatars of different types of workers performing each step of the activity may be executed based on the historical data so that it may be determined whether a current distribution of human and robotic workers is optimized based on a comparative evaluation of the plurality of digital twin simulations. In response to determining the current distribution is not optimized, a manager may be prompted with an AR overlaid slider bar regarding an objective of the manager. According to at least one embodiment, the objective of the manager may be an increase in quality of production. According to at least one other embodiment, the objective of the manager may be an increase in quantity of production. Then, a knowledge corpus including an optimized distribution of the human and the robotic workers may be generated based on the objective of the manager and the comparative evaluation such that a visual animation of the optimized distribution of the human and the robotic workers may be created based on the knowledge corpus. Upon creating the visual animation, the visual animation may be displayed to at least one human worker via an AR device as a digital image overlay.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to prompt a manager with an AR overlaid slider bar regarding an objective of the manager and, accordingly, display a visual animation of an optimized distribution of human and robotic workers to at least one human worker via an AR device.

Referring to FIG. 1, an exemplary computing environment 100 is depicted, according to at least one embodiment. Computing environment 100 contains an example of an environment for the execution of at least some of the computer code involved in performing the inventive methods, such as an activity visualization program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage 113 allows writing of data, deletion of data and re-writing of data. Some familiar forms of persistent storage 113 include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices 114 and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector. Peripheral device set 114 may also include a camera (e.g., conventional, thermal, and/or infrared), a machine, a robotic device, and/or any other device for performing labor related tasks.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments the private cloud 106 may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the activity visualization program 150 may be a program capable of receiving real-time and historical data relating to an activity in an industrial environment, prompting a manager with an AR overlaid slider bar regarding an objective of the manager, displaying a visual animation of an optimized distribution of human and robotic workers to at least one human worker via an AR device, dynamically and proactively determining the most optimum distribution of resources in any industrial environment, actively guiding a human worker on how to perform the steps of the activity, and considering the skills of the human and robotic workers when distributing the resources. Furthermore, notwithstanding depiction in computer 101, the accident visualization program 150 may be stored in and/or executed by, individually or in any combination, end user device 103, remote server 104, public cloud 105, and private cloud 106. The activity visualization method is explained in further detail below with respect to FIG. 2. It may be appreciated that the examples described below are not intended to be limiting, and that in embodiments of the present invention the parameters used in the examples may be different.

Figure 2:
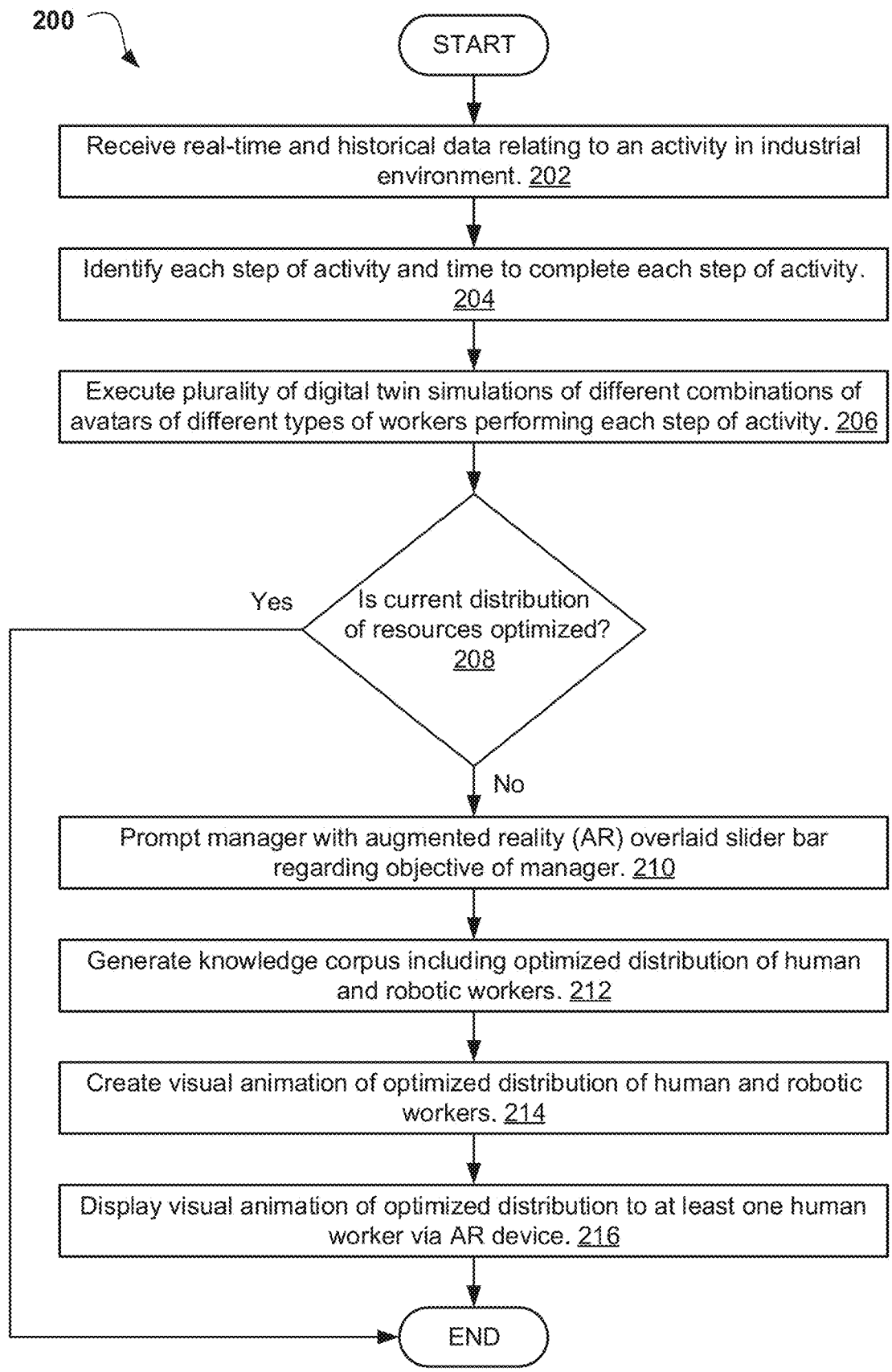
FIG. 2 illustrates an operational flowchart for augmented reality (AR)-based visualization of an activity with collaboration amelioration in an AR activity visualization process according to at least one embodiment.

Referring now to FIG. 2, an operational flowchart for AR-based visualization of an activity with collaboration amelioration in an AR activity visualization process 200 is depicted according to at least one embodiment. At 202, the activity visualization program 150 receives the real-time and historical data relating to the activity in the industrial environment.

The real-time data relating to the activity may include the type of activity to be performed, how the activity is performed (e.g., how different types of workers are collaborating), and the criticality of the activity. Examples of an activity may include, but are not limited to, assembling objects in a manufacturing facility, and transporting objects from one location to another, (e.g., moving a product from an assembly line to a shipping area). The real-time data relating to the activity may also include one or more objects associated with the activity. Examples of the object may include, but are not limited to, an automobile, a device on an assembly line, construction materials, and/or a machine. The real-time data relating to the activity may be received from a video feed of the industrial environment and/or IoT sensor set 125. For example, IoT sensor set 125 may include a thermal camera and/or an infrared camera to detect movements in the industrial environment.

The real-time data captured by the activity visualization program 150 may be stored in a database, such as remote database 130. The historical data relating to the activity may include the data stored in the database. For example, the historical data may include the type of activity that was performed in the past, how the activity was performed in the past, and the criticality of the activity in the past. Thus, the real-time data may become the historical data upon being incorporated into the database.

Then, at 204, the activity visualization program 150 identifies each step of the activity and the time to complete each step of the activity. The steps and the time to complete each step are identified based on the historical data. The activity visualization program 150 may access the historical data and analyze the activity workflow to identify the individual steps of the activity. For example, when the type of activity is transporting objects from one location to another, the sequence of the steps may be picking up an object from an assembly line, carrying the object to a shipping area, and then loading the object onto a vehicle.

Once the individual steps are identified, the time taken to complete each step may also be identified. Continuing the example described above, picking up the object may take five seconds, carrying the object to the shipping area may take five minutes, and loading the object onto the vehicle may take ten minutes. For each activity that is stored in the database, each step of that activity may be tagged with metadata indicating the time taken to complete each step.

Next, at 206, the activity visualization program 150 executes the plurality of digital twin simulations of different combinations of avatars of different types of workers performing each step of the activity. The plurality of digital twin simulations are executed based on the historical data. Examples of the types of workers may include, but are not limited to, human workers and robotic workers. The activity visualization program 150 may use known techniques to create the avatars of the human and robotic workers, and these avatars may be used in the digital twin simulation. The avatars used in the simulation may have the same specifications (e.g., weight and height) and skills (e.g., capabilities) the human and robotic workers have in the real-world. In addition, the objects interacted with in the simulation may have the same specifications the objects have in the real-world. In this manner, maximum accuracy may be preserved during the digital twin simulation. The avatars of different types of workers in the digital twin simulation may then perform the steps of the activity in accordance with the sequence of the steps.

According to at least one embodiment, at least one executed digital twin simulation may include at least one avatar of a human worker collaborating with at least one avatar of a robotic worker (i.e., human-to-robot collaboration) to perform the activity. For example, when the type of activity is transporting objects from one location to another, the sequence of the steps may be picking up an object from an assembly line, carrying the object to a shipping area, and then loading the object onto a vehicle. The accident visualization program 150 may search the historical data for one or more instances where the at least one human worker collaborated with the at least one robotic worker to perform each step of the activity in the real-world industrial environment. For example, the historical data may contain one or more instances where the at least one human worker collaborated with the at least one robotic worker to perform the picking up of the object from the assembly line, carrying of the object to the shipping area, and the loading of the object onto the vehicle. In this embodiment, the digital twin simulation may be executed with the avatar of the human worker and the avatar of the robotic worker collaborating with each other to perform each of the steps in the same manner as in the real-world industrial environment.

According to at least one other embodiment, at least one executed digital twin simulation may include at least one avatar of a human worker collaborating with at least one avatar of a different human worker (i.e., human-to-human collaboration) to perform the activity. For example, when the type of activity is transporting objects from one location to another, the sequence of the steps may be picking up the object from the assembly line, carrying the object to the shipping area, and then loading the object onto the vehicle. The accident visualization program 150 may search the historical data for one or more instances where the at least one human worker collaborated with the at least one different human worker to perform each step of the activity in the real-world industrial environment. For example, the historical data may contain one or more instances where the at least one human worker collaborated with the at least one different human worker to perform the picking up of the object from the assembly line, carrying of the object to the shipping area, and the loading of the object onto the vehicle. In this embodiment, the digital twin simulation may be executed with the avatar of the human worker and the avatar of the different human worker collaborating with each other to perform each of the steps in the same manner as in the real-world industrial environment.

According to at least one further embodiment, at least one executed digital twin simulation may include at least one avatar of a robotic worker collaborating with at least one avatar of a different robotic worker (i.e., robot-to-robot collaboration) to perform the activity. For example, when the type of activity is transporting objects from one location to another, the sequence of the steps may be picking up the object from the assembly line, carrying the object to the shipping area, and then loading the object onto the vehicle. The accident visualization program 150 may search the historical data for one or more instances where the at least one robotic worker collaborated with the at least one different robotic worker to perform each step of the activity in the real-world industrial environment. For example, the historical data may contain one or more instances where the at least one robotic worker collaborated with the at least one different robotic worker to perform the picking up of the object from the assembly line, carrying of the object to the shipping area, and the loading of the object onto the vehicle. In this embodiment, the digital twin simulation may be executed with the avatar of the robotic worker and the avatar of the different robotic worker collaborating with each other to perform each of the steps in the same manner as in the real-world industrial environment.

Then, at 208, the activity visualization program 150 determines whether the current distribution of the human and the robotic workers is optimized. The determination is made based on a comparative evaluation of the plurality of digital twin simulations. The current distribution of the human and the robotic workers may be defined by the number and types of workers assigned to perform each activity. For example, the step of loading the object onto the vehicle may be performed by two human workers, and the step of carrying of the object to the shipping area may be performed by one human worker and one robotic worker. As described above with respect to step 202, the real-time data relating to the activity may be received from the video feed of the industrial environment and/or IoT sensor set 125. Thus, the current distribution of the human and the robotic workers in the real-world industrial environment may be identified from the video feed and/or IoT sensor set 125. The comparative evaluation may include correlating and comparing each step of the plurality of digital twin simulations to determine which distribution of workers had the highest production quality and quantity output. The current distribution of the human and the robotic workers is optimized when no alternative distribution of the human and the robotic workers in the plurality of digital twin simulations results in a higher production quality and quantity output.

For example, a first digital twin simulation and a second digital twin simulation may each comprise the steps of be picking up the object from the assembly line, carrying the object to the shipping area, and then loading the object onto the vehicle. The step of picking up the object from the assembly line in the first digital twin simulation may be correlated with the same step of picking up the object from the assembly line in the second digital twin simulation, the step of carrying the object to the shipping area in the first digital twin simulation may be correlated with the same step of carrying the object to the shipping area in the second digital twin simulation, and the step of loading the object onto the vehicle in the first digital twin simulation may be correlated with the same step of loading the object onto the vehicle in the second digital twin simulation.

As described above with respect to step 206, the plurality of digital twin simulations may simulate different types of workers performing each step of the activity. Continuing the example described above, the step of picking up the object from the assembly line in the first digital twin simulation may be performed by two human workers, whereas the step of picking up the object from the assembly line in the second digital twin simulation may be performed by one human worker and one robotic worker. Continuing the example, when the two human workers perform the step, picking up the object from the assembly line may take ten seconds, carrying the object to the shipping area may take ten minutes, and loading the object onto the vehicle may take twenty minutes. However, when one human worker and one robotic worker perform the step, picking up the object from the assembly line may take five seconds, carrying the object to the shipping area may take five minutes, and loading the object onto the vehicle may take ten minutes. Thus, one human worker and one robotic worker performing the step may result in a higher production quantity output than two human workers performing the step since the time taken to perform each step is cut in half. In this example, when the current distribution of the human and the robotic workers includes the one human worker and the one robotic worker, the current distribution may be optimized. Contrarily, when the current distribution of the human and the robotic workers includes the two human workers, the current distribution may not be optimized.

Alternatively, when two human workers perform the step the object may become damaged, whereas when one human worker and one robotic worker perform the step the object is not damaged. Thus, one human worker and one robotic worker performing the step may result in a higher production quality output than two human workers performing the step since the object is not damaged. In this example, when the current distribution of the human and the robotic workers includes the one human worker and the one robotic worker, the current distribution may be optimized. Contrarily, when the current distribution of the human and the robotic workers includes the two human workers, the current distribution may not be optimized.

In response to determining the current distribution is not optimized (step 208, "No" branch), the AR activity visualization process 200 proceeds to step 210 to prompt the manager with the AR overlaid slider bar regarding the objective of the manager. In response to determining the current distribution is optimized (step 208, "Yes" branch), the AR activity visualization process 200 ends.

Figure 3:
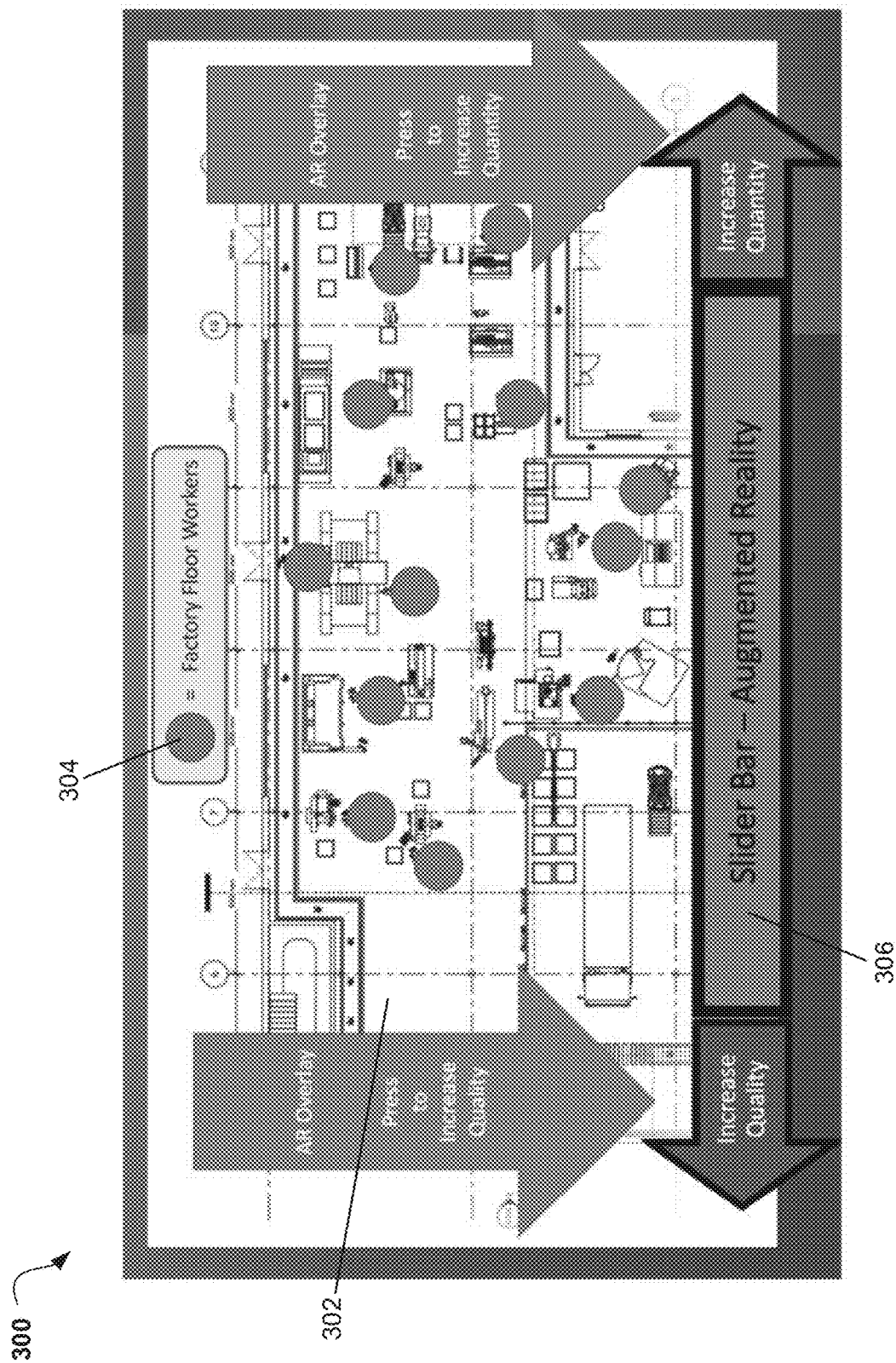
FIG. 3 is a diagram depicting an operational example of how an AR overlaid slider bar regarding an objective of a manager is displayed to a user via an AR device according to at least one embodiment.

Next, at 210, the activity visualization program 150 prompts the manager with the AR overlaid slider bar regarding the objective of the manager. The manager may be a foreman in the industrial environment. Examples of the objective of the manager may be an increase in the quality of production and/or an increase in the quantity of production. The AR overlaid slider bar may be presented to the manager via the AR device as a digital image overlay in the real-world industrial environment, as illustrated in FIG. 3 and described in further detail below with respect to the description of FIG. 3. The manager may move the AR overlaid slider bar with hand and/or eye gestures. For example, the manager may extend their finger parallel to the ground and move the finger upwards, downwards, and/or side-to-side. In another example, the manager may move their eyes upwards, downwards, and/or side-to-side. Moving the AR overlaid slider bar in a particular direction may be indicative of the objective of the manager, described in further detail below with respect to step 212.

Then, at 212, the activity visualization program 150 generates the knowledge corpus including the optimized distribution of the human and the robotic workers. The knowledge corpus is generated based on the objective of the manager and the comparative evaluation. As described above with respect to step 210, the manager may move the AR overlaid slider bar with hand and/or eye gestures.

According to at least one embodiment, generating the knowledge corpus may include identifying a first objective of the manager in response to determining the manager moves the AR overlaid slider bar in a first direction. For example, when the manager moves the AR overlaid slider bar to the right, the activity visualization program 150 may identify the first objective as the increase in the quantity of production. In this embodiment, when the objective of the manager is the first objective (e.g., increase in the quantity of production), the knowledge corpus may include the most optimum distribution of the human and the robotic workers to increase the quantity of production. For example, the most optimum distribution of the human and the robotic workers to increase the quantity of production may be for two robotic workers to perform each step of the activity.

According to at least one other embodiment, a second objective of the manager may be identified in response to determining the manager moves the AR overlaid slider bar in a second direction. For example, when the manager moves the AR overlaid slider bar to the left, the activity visualization program 150 may identify the second objective as the increase in the quality of production. In this embodiment, when the objective of the manager is the second objective (e.g., increase in the quality of production), the knowledge corpus may include the most optimum distribution of the human and the robotic workers to increase the quality of production. For example, the most optimum distribution of the human and the robotic workers to increase the quality of production may be for two human workers to perform each step of the activity.

Next, at 214, the activity visualization program 150 creates the visual animation of the optimized distribution of the human and the robotic workers. The visual animation is created based on the knowledge corpus. The created visual animation may be an AR representation of the avatars of the human and/or robotic workers collaborating with each other to perform each step of the activity that is consistent with the most optimized distribution of the human and the robotic workers described above with respect to step 212. For example, when the most optimized distribution of the human and the robotic workers is for two human workers to perform each step of the activity, the visual animation may include the avatars of the two human workers performing each step of the activity. In another example, when the most optimized distribution of the human and the robotic workers is for one human worker and one robotic worker to perform each step of the activity, the visual animation may include the avatar of the human worker and the avatar of the robotic worker performing each step of the activity.

The AR representation may be configured to be superimposed over the real-world industrial environment when displayed to the at least one human worker, described in further detail below with respect to step 216. According to at least one embodiment, the AR representation of the avatars may be a series of still images. According to at least one other embodiment, the AR representation of the avatars may be a video image. In either embodiment, the AR representation of the avatars may include the range of motions the avatars make while performing each step of the activity. In this manner, the visual animation of the optimized distribution of the human and the robotic workers may instruct the at least one human worker as to how the at least one human worker should be collaborating with the at least one other worker. The at least one other worker may be either a human worker and/or a robotic worker.

Then, at 216, the activity visualization program 150 displays the visual animation to the at least one human worker via the AR device as the digital image overlay. The AR device may by the AR goggles or the AR headset. The AR representation may be superimposed over the real-world multi-machine environment, as described above with respect to step 214. The AR representation may be displayed directly in front of the viewing direction of the at least one human worker prior to the time at which the collaboration of the at least one human worker is required in the real-world industrial environment. For example, the AR representation may be displayed to the at least one human worker 15 minutes before the at least one user is required to collaborate.

According to at least one embodiment, for each step of the activity, the avatar of the at least one human worker performing the step with the avatar of the at least one other worker may be displayed to the at least one human worker consistent with the optimized distribution. For example, when the most optimized distribution of the human and the robotic workers is for one human worker and one robotic worker to perform each step of the activity, the visual animation displayed to the at least one human worker may include the avatar of the human worker and the avatar of the robotic worker performing each step of the activity. According to at least one other embodiment, the participation of human workers may not be required for one or more steps of the activity. In this embodiment, the visual animation displayed to the at least one human worker may include the avatars of robotic workers performing the one or more steps, signaling to the at least one human worker that they should not participate in those one or more steps.

According to at least one further embodiment, the activity visualization program 150 may track the real-time progress of the activity via the video feed of the industrial environment and/or IoT sensor set 125. While tracking the real-time progress, the activity visualization program 150 may identify which steps have been completed and which steps are to be performed. In this embodiment, the steps that have been completed may not be displayed to the at least one human worker, whereas the steps that are to be performed may be displayed to the at least one human worker.

Referring now to FIG. 3, a diagram 300 depicting an operational example of how an AR overlaid slider bar 306 regarding an objective of a manager is displayed to a user (i.e., the at least one human worker) via an AR device is shown according to at least one embodiment. In the diagram 300, the industrial environment 302 may include a plurality of factory floor workers 304. The plurality of factory floor workers 304 may be comprised of the at least one human worker and/or the at least one robotic worker. The plurality of factory floor workers 304 may be collaborating with each other to interact with one or objects in the industrial environment 302. The AR overlaid slider bar 306 may be presented to the manager via the AR device as a digital image overlay in the real-world industrial environment 302. In this embodiment, when the manager moves the AR overlaid slider bar 306 to the right, the objective of the manager may be identified as increasing the quantity of production. When the manager moves the AR overlaid slider bar 306 to the left, the objective of the manager may be identified as increasing the quality of production. Alternatively, the manager may point their finger towards the right edge of the AR overlaid slider bar 306 to increase the quantity of production and towards the left edge of the AR overlaid slider bar 306 to increase the quality of production. Regardless of the objective, additional resources may need to be incorporated into the industrial environment 302. The additional resources may be displayed along with the plurality of factory floor workers 304 to the manager in accordance with the optimized distribution of the plurality of factory floor workers 304.

It may be appreciated that FIGS. 2 and 3 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of augmented reality (AR)-based visualization of an activity with collaboration amelioration, the method comprising:

receiving real-time and historical data relating to an activity in an industrial environment;

identifying each step of the activity and a time to complete each step of the activity based on the historical data;

executing a plurality of digital twin simulations of different combinations of avatars of different types of workers performing each step of the activity based on the historical data;

determining whether a current distribution of human and robotic workers in the industrial environment is optimized based on a comparative evaluation of the plurality of digital twin simulations, wherein the current distribution of the human and the robotic workers is defined by a number and types of workers assigned to perform each step of the activity, and wherein the current distribution of the human and the robotic workers is optimized when no alternative distribution of the human and the robotic workers results in higher production quantity output;

in response to determining the current distribution is not optimized, prompting a manager with an AR overlaid slider bar regarding an objective of the manager;

generating a knowledge corpus including an optimized distribution of the human and the robotic workers based on the objective of the manager and the comparative evaluation;
creating a visual animation of the optimized distribution of the human and the robotic workers in the industrial environment based on the knowledge corpus, wherein the optimized distribution differs from the current distribution; and
displaying the visual animation to at least one human worker via an AR device as a digital image overlay.

2. The computer-based method of claim 1, wherein at least one executed digital twin simulation includes at least one avatar of a human worker collaborating with at least one avatar of a robotic worker.

3. The computer-based method of claim 1, wherein at least one executed digital twin simulation includes at least one avatar of a human worker collaborating with at least one avatar of a different human worker.

4. The computer-based method of claim 1, wherein generating the knowledge corpus further comprises:
identifying a first objective in response to determining the manager moves the AR overlaid slider bar in a first direction.

5. The computer-based method of claim 4, further comprising:
identifying a second objective in response to determining the manager moves the AR overlaid slider bar in a second direction.

6. The computer-based method of claim 1, wherein displaying the visual animation to the at least one human worker via the AR device further comprises:
displaying, for each step of the activity, an avatar of the at least one human worker performing the step with an avatar of at least one other worker consistent with the optimized distribution.

7. The computer-based method of claim 1, wherein the objective of the manager includes an increase in quantity of production.

8. A computer system, the computer system comprising:
one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
receiving real-time and historical data relating to an activity in an industrial environment;
identifying each step of the activity and a time to complete each step of the activity based on the historical data;
executing a plurality of digital twin simulations of different combinations of avatars of different types of workers performing each step of the activity based on the historical data;
determining whether a current distribution of human and robotic workers in the industrial environment is optimized based on a comparative evaluation of the plurality of digital twin simulations, wherein the current distribution of the human and the robotic workers is defined by a number and types of workers assigned to perform each step of the activity, and wherein the current distribution of the human and the robotic workers is optimized when no alternative distribution of the human and the robotic workers results in higher production quantity output;

in response to determining the current distribution is not optimized, prompting a manager with an AR overlaid slider bar regarding an objective of the manager;
generating a knowledge corpus including an optimized distribution of the human and the robotic workers based on the objective of the manager and the comparative evaluation;
creating a visual animation of the optimized distribution of the human and the robotic workers in the industrial environment based on the knowledge corpus, wherein the optimized distribution differs from the current distribution; and
displaying the visual animation to at least one human worker via an AR device as a digital image overlay.

9. The computer system of claim 8, wherein at least one executed digital twin simulation includes at least one avatar of a human worker collaborating with at least one avatar of a robotic worker.

10. The computer system of claim 8, wherein at least one executed digital twin simulation includes at least one avatar of a human worker collaborating with at least one avatar of a different human worker.

11. The computer system of claim 8, wherein generating the knowledge corpus further comprises:
identifying a first objective in response to determining the manager moves the AR overlaid slider bar in a first direction.

12. The computer system of claim 11, further comprising:
identifying a second objective in response to determining the manager moves the AR overlaid slider bar in a second direction.

13. The computer system of claim 8, wherein displaying the visual animation to the at least one human worker via the AR device further comprises:
displaying, for each step of the activity, an avatar of the at least one human worker performing the step with an avatar of at least one other worker consistent with the optimized distribution.

14. The computer system of claim 8, wherein the objective of the manager includes an increase in quantity of production.

15. A computer program product, the computer program product comprising:
one or more computer-readable tangible storage medium and program instructions stored on at least one of the one or more computer-readable tangible storage medium, the program instructions executable by a processor capable of performing a method, the method comprising:
receiving real-time and historical data relating to an activity in an industrial environment;
identifying each step of the activity and a time to complete each step of the activity based on the historical data;
executing a plurality of digital twin simulations of different combinations of avatars of different types of workers performing each step of the activity based on the historical data;
determining whether a current distribution of human and robotic workers in the industrial environment is optimized based on a comparative evaluation of the plurality of digital twin simulations, wherein the current distribution of the human and the robotic workers is defined by a number and types of workers assigned to perform each step of the activity, and wherein the current distribution of the human and the robotic workers is optimized when no alternative distribution of the human and the robotic workers results in higher production quantity output;

in response to determining the current distribution is not optimized, prompting a manager with an AR overlaid slider bar regarding an objective of the manager;

generating a knowledge corpus including an optimized distribution of the human and the robotic workers based on the objective of the manager and the comparative evaluation;

creating a visual animation of the optimized distribution of the human and the robotic workers in the industrial environment based on the knowledge corpus, wherein the optimized distribution differs from the current distribution; and displaying the visual animation to at least one human worker via an AR device as a digital image overlay.

16. The computer program product of claim 15, wherein at least one executed digital twin simulation includes at least one avatar of a human worker collaborating with at least one avatar of a robotic worker.

17. The computer program product of claim 15, wherein at least one executed digital twin simulation includes at least one avatar of a human worker collaborating with at least one avatar of a different human worker.

18. The computer program product of claim 15, wherein generating the knowledge corpus further comprises:
identifying a first objective in response to determining the manager moves the AR overlaid slider bar in a first direction.

19. The computer program product of claim 18, further comprising:
identifying a second objective in response to determining the manager moves the AR overlaid slider bar in a second direction.

20. The computer program product of claim 15, wherein displaying the visual animation to the at least one human worker via the AR device further comprises:
displaying, for each step of the activity, an avatar of the at least one human worker performing the step with an avatar of at least one other worker consistent with the optimized distribution.

* * * * *